United States Patent [19]

Rees

[11] Patent Number: 4,824,179
[45] Date of Patent: Apr. 25, 1989

[54] EMPTY AND LOAD BRAKE APPARATUS FOR UNITIZED RAILROAD TRAINS

[76] Inventor: James G. Rees, 1212 N. Lake Shore Dr., Chicago, Ill. 60610

[21] Appl. No.: 891,711

[22] Filed: Jul. 31, 1986

[51] Int. Cl.$^4$ .......................... B60T 8/18; G01L 5/00
[52] U.S. Cl. .................................. 303/22.7; 303/22.2; 116/203
[58] Field of Search ...................... 303/23 A, 7, 59, 62, 303/23 R, 22 A, 22 R, 22.2, 22.7, 22.1, 56; 116/203, 215; 340/686; 81/19, 21, 22

[56] References Cited

U.S. PATENT DOCUMENTS

| | | | |
|---|---|---|---|
| 3,612,621 | 10/1971 | Scott | 303/22 R |
| 4,179,165 | 12/1979 | Page et al. | 303/59 |
| 4,230,374 | 10/1980 | King | 303/22 R |
| 4,423,909 | 1/1984 | Page et al. | 303/23 R |
| 4,648,661 | 3/1987 | Schmitt et al. | 303/23 R |

Primary Examiner—Andres Kashnikow
Assistant Examiner—Timothy Newholm
Attorney, Agent, or Firm—Todd S. Parkhurst

[57] ABSTRACT

An empty and load air brake control apparatus is disclosed, which is especially adapted for use on a unitized railroad train. Such a train includes a plurality of railroad car body segments articulated together in end-to-end array, and each car body segment can be loaded with coal or other material independently of the other car body segments. A plurality of railroad car trucks are provided to support the car body segments, and are arranged so that a single truck supports two adjacent car body ends. The air brake control apparatus includes a control valve, and a plurality of brake modulator valves are each connected to the control valve by compressed air piping. Each brake actuator is associated with a single truck and a single corresponding modulator valve. The modulator valves each have a sensor for sensing whether an associated truck is supporting loaded car body segments or empty car body segments. The sensor includes a mallet having an elastomeric or resilient member disposed within a well formed in the mallet head.

3 Claims, 4 Drawing Sheets

EMPTY AND LOAD BRAKE APPARATUS FOR UNITIZED RAILROAD TRAINS

This invention relates generally to empty and load air brake control apparatus for railroad trains, and more particularly concerns empty and load air brake control systems and valves especially designed for use with unitized railroad trains.

The advent of very large railroad freight cars has required sophisticated controls for the car air brakes. A fully loaded modern coal-bearing railroad freight car is very heavy; and when it is traveling at high speeds, the car momentum is very great. To control this great car momentum, brake shoes must be powerfully applied to the railroad car wheels. Generally, this requires the use of relatively high-pressure air and powerful springs in the brake actuators associated with the brake shoes. But when the car is empty, it has considerably less weight and its momemtum is much less. Considerably less powerful forces must be applied to the railroad car brake shoes if smooth, controlled braking action is to be obtained.

Systems and mechanisms for modulating brake air pressures in accordance with the empty or loaded condition of the railroad cars are disclosed and claimed in U.S. Pat Nos. 4,179,165 and 4,423,909.

Recently, so-called "unit trains" have brought new efficiency to the shipment of large numbers of freight containers. These "unit trains" may include a great number of railroad car body segments which are more or less permanently joined in an articulated end-to-end array. To provide economy in construction, a single underlying railroad car truck is provided at each articulation; that is, a single railroad car truck supports two adjacent railroad car body segment ends.

But unit train loading practice occasionally provides differing loads in the various car bodies. Thus, it is possible that some car bodies will be heavily loaded and will have great momentum, while adjacent car bodies will be more lightly loaded. But properly modulated braking action must be provided at each of the underlying railroad car trucks. Braking action for each truck must be appropriate to the load borne by that truck. The supported load and required braking action may be independent of the load and braking action required of an adjacent truck if smooth and controllable braking action is to be available to the train engineer.

It is accordingly the general object of the present invention to provide an empty and load braking system and valves for use with a unitized train of railroad cars or car body segments.

It is another object of the invention to provide an empty and load braking system which will properly modulate and control the braking action of a given railroad car truck independently of the modulating action required of an adjcent truck.

SUMMARY OF THE INVENTION

To meet these objectives, an empty and load air brake control apparatus is provided, which is especially adapted for use on a unitized railroad train. The train includes a plurality of railroad car body segments articulated together in end-to-end array, and each car body segment can be loaded with coal or other material independently of the other car body segments. A plurality of railroad car trucks are provided to support the car body segments, and are arranged so that a single truck supports two adjacent car body ends. The air brake control apparatus of the present invention includes a control valve, and a plurality of brake modulator valves are each connected to the control valve by compressed air piping. Each brake actuator is associated with a single truck and a single corresponding modulator valve. The modulator valves each have a sensor means for sensing whether an associated truck is supporting loaded car body segments or empty car body segments. The sensor includes a mallet having an elastomeric or resilient member disposed within a well formed in the mallet head.

Other objects, advantages and aspects of the invention will become apparent upon reading the following detailed description and upon reference to the drawings. Throughout the drawings, like reference numerals refer to like parts.

DETAILED DESCRIPTION

While the invention will be described in connection with a preferred embodiment, it will be understood that it is not intended to limit the invention to this embodiment. On the contrary, it is intended to cover all alternatives, modifications and equivalents as may be included within the spirit and scope of the invention as defined by the appended claims.

Figure 1:
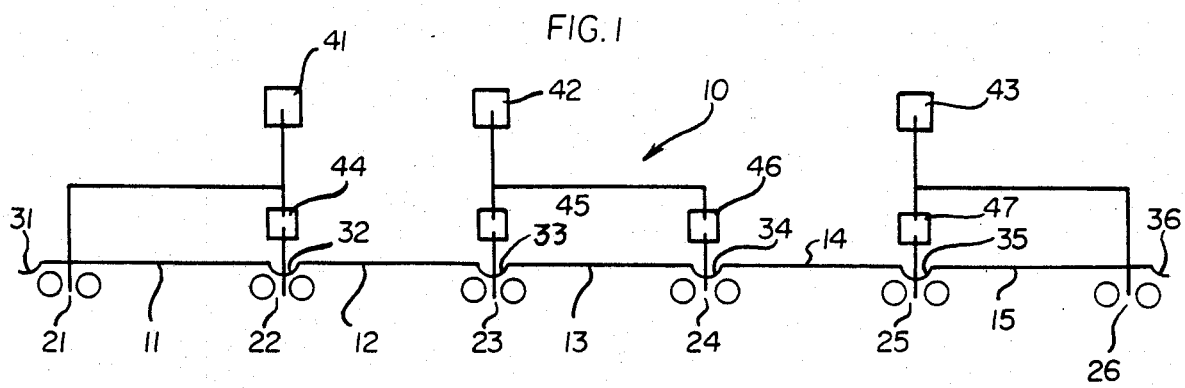
FIG. 1 is a schematic representation of a section of a unitized railroad train.

Turning first to FIG. 1, there is schematically shown a unit train multiple-segment well car 10. This car 10 comprises a series of segments or more or less standard car bodies 11, 12, 13, 14 and 15 which are supported on underlying trucks 21, 22, 23, 24, 25 and 26. The car segments or bodies 11–15 can be of the type used to transport freight containers, for example. The bodies 11–15 are arranged in an end-to-end articulated array upon well structures 31–36 so that adjacent ends of adjacent cars are supported by a single truck at articulation joints or wells. For example, adjacent ends of the car bodies 13 and 14 are supported on a single truck 24 by a well structure 34. In the illustration, six trucks 21–26 are required to support five car body segments 11–15; if each car body 11–15 were to be provided with the standard two trucks, ten trucks would have been required for this part of the train. By so arranging the body segment and trucks, swiveling is permitted at the wells 31–36 and trucks 21–26 so that the long car 10 can properly negotiate curves. It will be understood that if car body segments 11 and 13 are heavily loaded, and if car body segment 12 is partly loaded and if car body segments 14 and 15 are only lightly loaded, differing braking power and differing brake actuator modulation might be required at every truck 21-26. Control valves 41, 42 and 43 and load sensing brake modulator valves (LSBM valves) 44, 45, 46 and 47 provide the necessary air pressure and modulation to effect the desired braking action.

Figure 2:
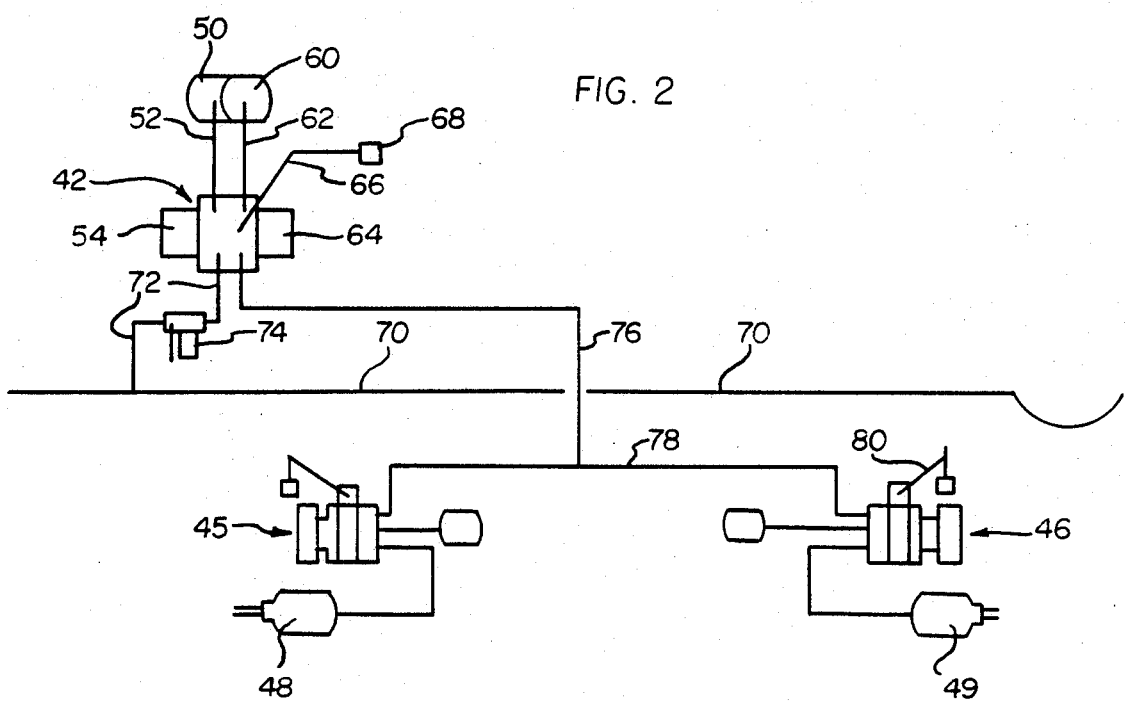
FIG. 2 is a schematic diagram showing the general arrangement of the brake control and modulating system of the present invention.

As illustrated in FIG. 2, a single control valve 42 can be connected to a plurality of load sensing brake modulators (LSBM) valves 45 and 46. However, each LSBM valve 45 or 46 is connected to a single brake actuator 48 or 49.

The control valve 42 can be of the usual ABD type or equivalent. An auxiliary passageway air reservoir 50 is connected by a pipe 52 to a service portion 54 of the valve, and an emergency reservoir 60 is connected by a pipe 62 to an emergency portion 64 of the valve 42. When the brakes are released, the control valve 42 operates to release brake cylinder air pressure to the atmosphere through a pipe 66 and retaining valve device 68 of known construction. Pressurized air is supplied to the valve 42 through a standard brake pipe 70 which runs the length of the train. A supply pipe 72 delivers pressurized air to the control valve 42 through a cut-out cock 74. Pressurized air is provided from the control valve 42 to each associated LSBM valve 45 and 46 via control valve pipes 76 and 78.

Figure 3:
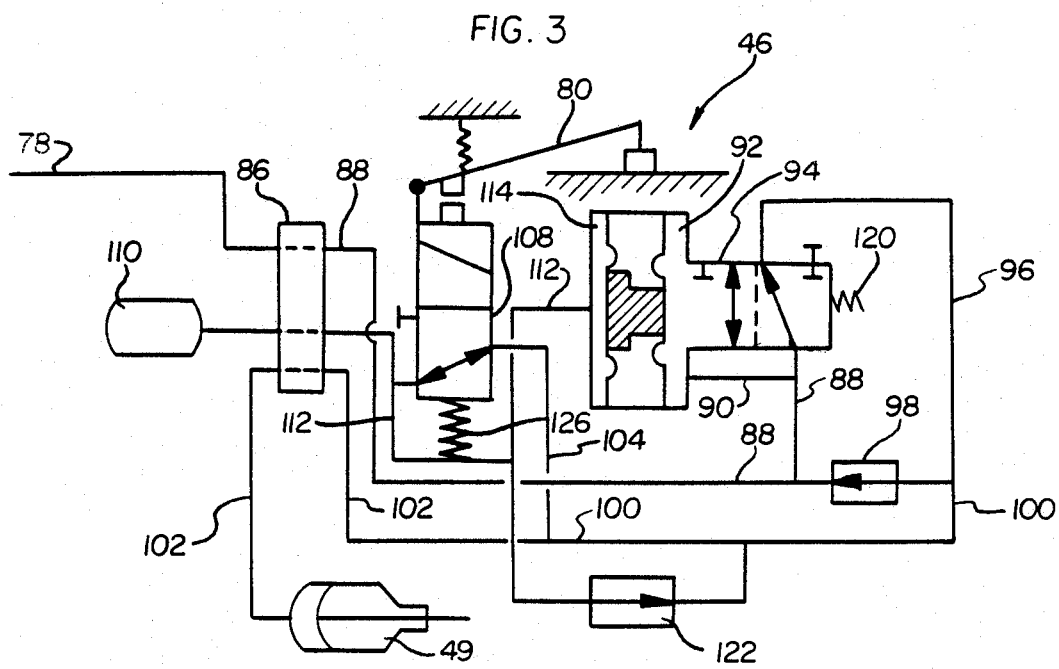
FIG. 3 is a schematic diagram of the load sensing brake pressure modulating valve and associated mechanisms.
Figure 4:
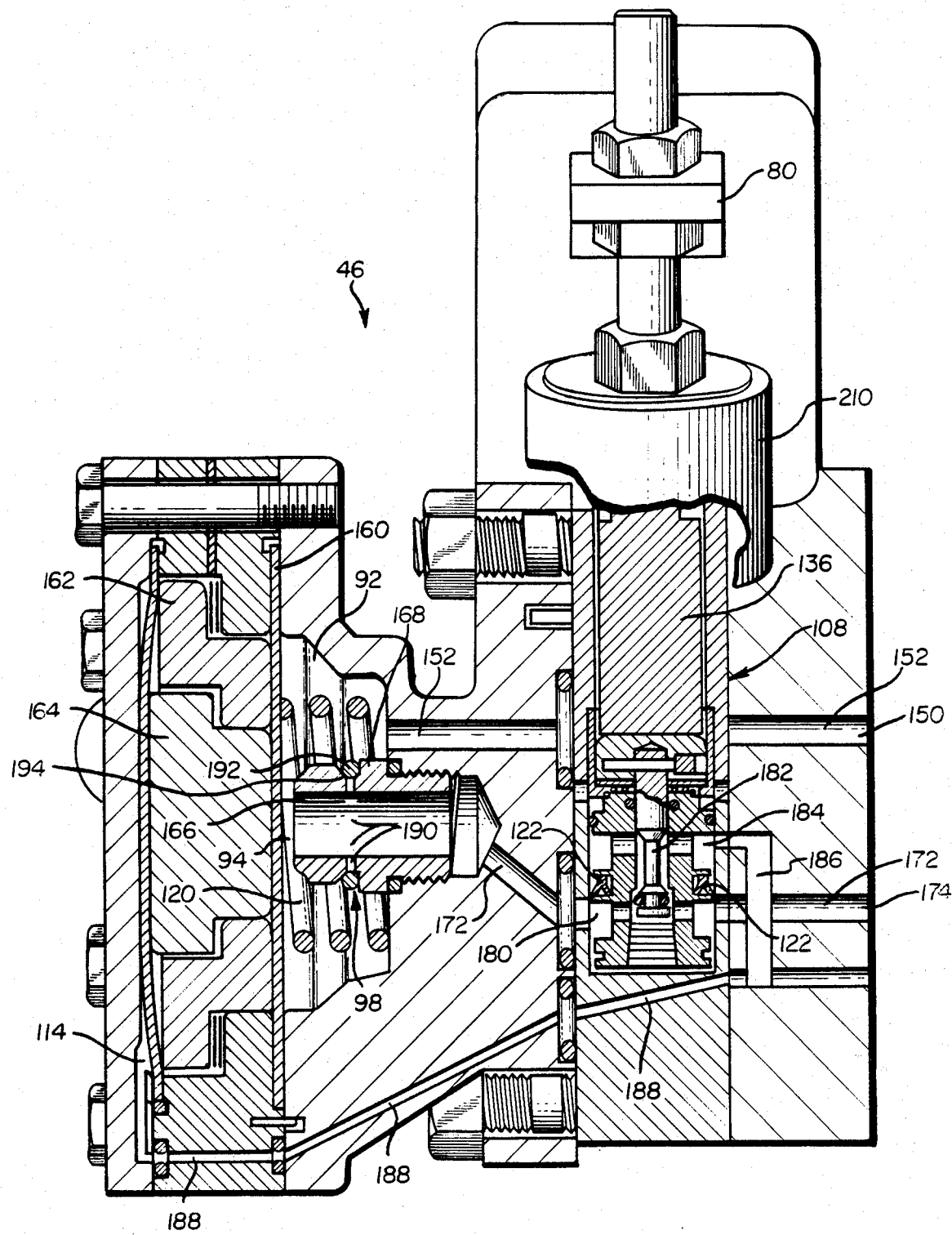
FIG. 4 is a sectional view of the modulating valve schematically illustrated in FIG. 3, the valve parts being shown as they appear when the valve is in its car-empty configuration.
Figure 5:
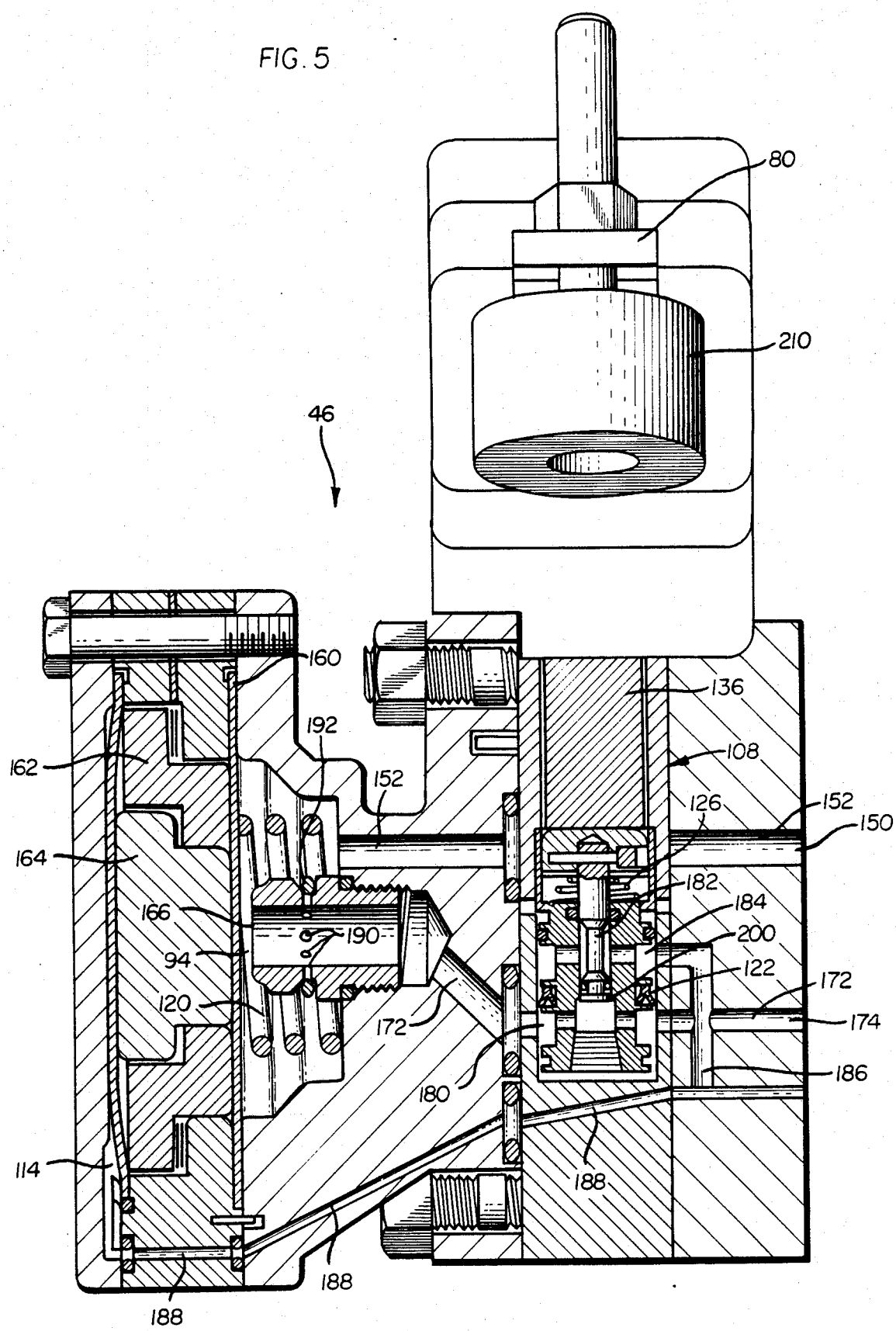
FIG. 5 is a sectional view of the modulating valve similar to FIG. 4 but showing the valve parts as they appear when the valve in its car-loaded configuration.
Figure 6:
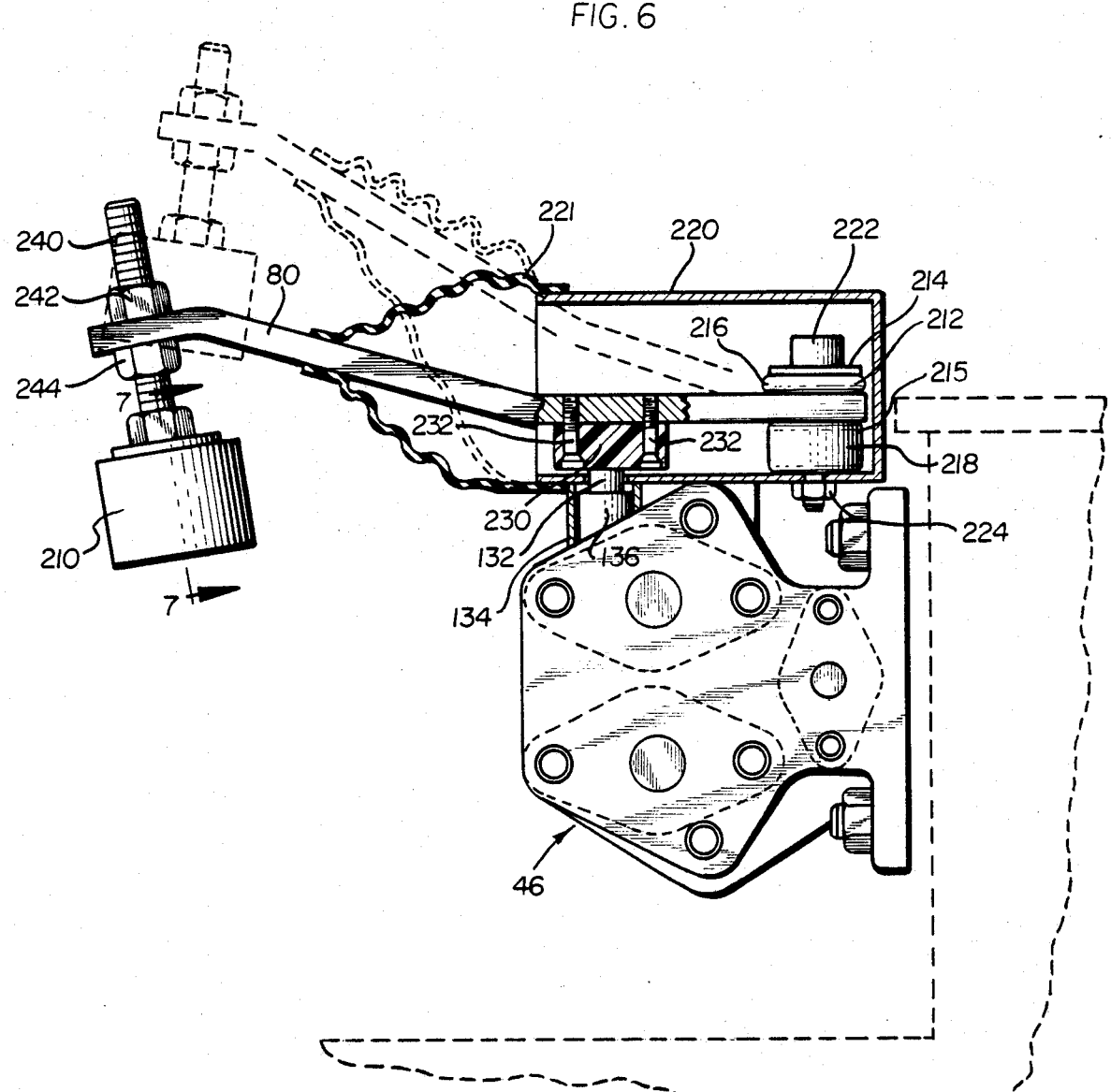
FIG. 6 is an elevational view in partial section of the valve sensor and actuator mechanism.
Figure 7:
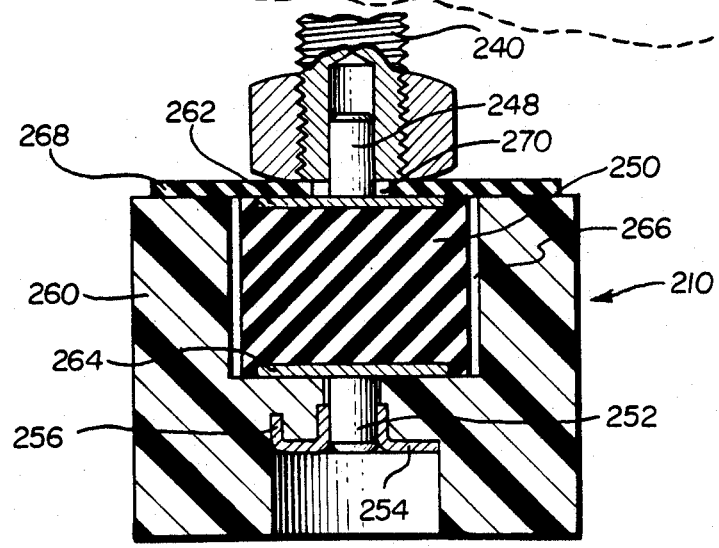
FIG. 7 is a sectional view taken substantially in the plane of line 7—7 in FIG. 6 and showing the interior of the valve mallet sensor.

The LSBM valve 46 shown in FIGS. 4-6 and illustrated schematically in FIG. 3 operates to modulate air pressure delivered to the associated brake actuator 49 according to whether the associated load-supporting truck is bearing a heavy load or a light load. The LSBM valve is mounted to the truck bolster. Bolsters are well-known elements of railroad trucks; the ends of this beam-like element are commonly fitted into the truck side rails to rest upon the truck springs. Thus, the bolster is a sprung element; it will move downwardly toward the underlying rails as weight is added to the car body segments and well mechanism which are supported by the bolster. If both car bodies supported by the truck are loaded, the weight will urge downwardly the bolster, the well mechanism and the car body segments The LSBM valve 46 includes a sensor arm 80 which is positioned for engagement by a low, loaded car body. As will be explained in further detail below, movement of the sensor arm re-configures the valve parts to provide proper brake pressure modulation, depending upon the empty or loaded condition of the car. When no load is present in the adjacent cars, brake pressure is modulated; but when the car segments are loaded, no modulation occurs and the brakes are operated at full air pressure values.

As suggested in the valve schematic diagram in FIG. 3, pressurized air is delivered to the valve through piping 78 and an adaptor or connector manifold device 86. The air is then routed along an internal valve path 88, by which the air moves along a branch 90 to a piston-and-diaphragm chamber 92, and also to a resettable check valve mechanism 94 associated with the chamber 92. In the valve condition illustrated in FIG. 3, air flows through the valve mechanism 94 and through the path 96 to a transfer conduit 100 and an actuator conduit 102 leading to the brake actuator 49. Remaining pressure and air is also routed by a branch conduit 104 through a sensor valve 108 and out to a supplemental air volume reservoir 110. Air passing through the valve 108 is routed to a passageway 112 and to an opposite side 114 of the diaphragm chamber 92.

As air pressure rises on the opposite side 114 of the diaphram chamber, the valve mechanism 94 is closed; that is, air and pressure are prevented from moving from the passageway 88 to the recirculating path 96. Continued pressure delivery to the brake actuator 49 thus halts. Braking action pressures in the actuator 49 are thus modulated.

When the control valve 42 moves to its release position, it permits the air pressure in the pipe 76 to be released to the atmosphere, via line 66 and retainer 68. In the modulator valve 46, this reduction of pressure permits air flow through the check valve 98, thus reducing pressure in passage 96, and permitting a spring 120 to move the diaphragm in the chamber 92, 114 to the left. This action in effect opens the valve 94, thereby venting the actuator 49 through line 102, 100, check valve 98 and line 88 to atmosphere and releasing the brakes.

The check valve 122 is required only occasionally. The valve 108 is normally closed. If the brake actuator 49 has applied the brakes when the car segment is empty, and then the car is loaded, the line 112 and check valve 122 permit the actuator 49 to be pressurized by reservoir 110 through lines 88, valve 94 and lines 96, 100 and 102, so as to release the brakes. This same function protects the brakes from improper action during car by segment "rock and roll" or sway action during circumstances where sway action might tend to cause the sensor 80 to alternate between empty and loaded modes.

When the car body segments are loaded, their weight forces the bolster and attached valve body downwardly, but the truck side frame remains stationary. As the valve body moves downwardly, the sensor arm 80 is engaged by the side frame, and the arm is thus repositioned in an upward configuration. An actuator spring 126 moves the valve 108 to its closed position. In this configuration, air in lines 96 and 100 cannot move to the diaphragm side 114 of the reservoir 110. The modulating valve 94 does not function, but rather remains constantly open. Thus, pressure in the line 78 is delivered without modulation or reduction to the brake actuator 49.

The LSBM valve 46 is illustrated in its empty-operating configuration in FIG. 4, and in its loaded-operating configuration in FIG. 5. The left hand portion of the valve is similar in construction and operation to the mechanism shown and described in U.S. Pat. Nos. 4,179,165 and 4,423,909, to which reference may be made for details. The right hand portion of the valve 108 includes a spool valve mechanism commercially available from Versa Products Company of New Jersey as a "Series B cartridge valve, normally closed." The valve is modified as discussed below. An actuator button 132 atop the valve frame 134 engages a relay piston 136 to operate or reconfigure the spool valve 108 (FIGS. 6, 4 and 5).

When train brakes are to be applied through the valve 46 in its empty-operating condition shown in FIG. 4, pressurized air in the pipe 78 from the control valve 42 is delivered to an inlet port 150. Pressure and air flow travel down an internal passage 152 behind the valve mechanism 108 and to the diaphragm chamber 92. Here, air flows past the diaphragm 10 and pistons 162 and 164 to and into the mouth 166 of a spool 168. The air and pressure is then transmitted along a passage 172 behind the valve 108 to a port 174 which leads to the line 102 and brake actuator 49 shown in FIG. 3.

The passage 172 also communicates with the valve 108. Air and pressure pass along the branch through ports 180 and around a valve spool 182 to ports 184 and a branch passage 186. From this passage 186, air and pressure are led to a bleed passage 188 and to the diaphragm side 114 of the chamber 92. Pressure gradually rises in the chamber 114, and when pressure has risen sufficiently, the piston 162 and 164 are urged to the right, overcoming the action of the spring 120 thereby forcing the diaphragm 160 into a closed position against the mouth 166 of the spool 168. When the spool mouth is closed, no further air or pressure are delivered to the passage 172 or the downstream line 102 or brake actuator 49 (FIGS. 4 and 3).

When brake release is desired, pressure is released through the control valve 42 to atmosphere through line 66 and retainer 68 (FIG. 2). This action releases pressure in the control line 76 and pipe 78 so as to drop pressure in the valve passage 150 and the chamber 92 (FIG. 4). Because the spool mouth 166 is closed, pressure and air cannot leave the passage 172 and spool 168 through the mouth 166. Instead, the air exits the spool through a series of ports 190 and around an O-ring 192 which is seated in a groove 194. Together, the ports 190, O-ring 192 and groove 194 form the check valve 98 schematically shown in FIG. 3. Air escaping the check valve 98 flows back through the chamber 92 and passage 152. As the pressure in the line 102 and actuator 49 falls, the brakes are released. Air also bleeds out of the chamber 114 and line 188 until the spring 120 is able to move the diaphragm 160 away from the spool mouth 166.

The configuration of the valve in the car-loaded condition is shown in FIG. 5. When the brakes are to be applied, air and increased pressure travel through the passage 152, the chamber 92, the spool mouth 166, and along the passage 172 to the line 102 and actuator 49 shown in FIG. 3. But because the sensor arm 80 is raised, the valve spool 182 is also raised into a position against a seat 200 blocking air or pressure from entering the bleed or recirculating ports 184 or passages 186, 188 or the chamber 114. Consequently, no modulation occurs, and the brakes are applied with unmodulated pressure. When brake release is desired, air and pressure are exhausted along the line 172, through the spool 168 and chamber 97, and out the passage 152. When the valve 46 is in the car loaded position, the spool mouth 166 is always open.

It will be noted that the check valve 122 schematically shown in FIG. 3 takes the form of an annular ring having an inverted U-shaped or Y-shaped cross-sectional configuration. This device is a modification to the commercially available spool valve mechanism 108 described above. It permits air to flow from the ports 184 and passage 186 to the port 180, but inhibits reverse flow.

The operation of the chambers 114 and 92 and the interposed piston 162 and 164 are described in further detail in U.S. Pat. Nos. 4,179,165 and 4,423,909, as noted above. As these patents explain, and as those familiar with the operation of such mechanisms will understand, a pressure in the chamber 114 of from 40% to 90% of the pressure in the chamber 92 is sufficient to effect movement of the diaphragm 160 and cause modulation, depending upon the configuration of the pistons 162 and 164 and the strength of the spring 120. Because the sensor valve 108 is separate from the modulation mechanisms, the sensor valve 108 can be effectively used with a modulation mechanism configured to operate at any desired percent pressure. The modulation parts can be selected to provide a desired modulation without affecting the sensor valve 108 design or installation.

In accordance with one aspect of the invention, the sensor arm 80 and mallet 210 shown in FIGS. 4–7 are constructed to withstand the heavy wear and tear of railroad operations, yet they are surprisingly inexpensive and effective. A pivot structure 212 includes a rigid washer 214 and an elastomeric mushroom member 215 having a resilient washer 216 atop the sensor arm 80, and an elastomeric spacer 218 below the arm. All these parts are connected to a valve housing by a bolt 222 and nut 224. The housing 220 is affixed to the valve 46 as shown in FIG. 6 and a boot 221 cooperates with the housing to exclude dirt and corruption from the mechanism.

Spaced from the pivot structure is a contact element 230 which can be made from commercially available ultra-high molecular weight polyethylene or other suitable material. This element 230 can be conveniently attached by bolts 232 to the sensor arm 80 at a point to engage or actuate the button 132 to reconfigure the valve 108 as described above.

At the end of the arm 80, the truck-side-frame-engaging mallet 210 is located. Here the mallet 210 includes a shank 240 attached by jam nuts 242, 244 to the arm 80. As particularly shown in FIG. 7, the shank is affixed to a stud 248 extending from a flexible connector element 250. This flexible connector element is available from the Lord Manufacturing Company of Erie, Pa. as Model J-4624 connector. At the opposite end of the connector 250, another stud 252 is connected to a nut-like member 254 having tangs 256 which extend to engage a surrounding mallet head member 260. This cylindrical head member 260 can be conveniently made of commercially available ultra-high molecular weight wear-resistant plastic. To provide good connection between the studs 248 and 252, each stud is affixed to a washer-like interconnector 262 and 264, and the interconnectors are molded to and partially within the flexible connector element 250. To permit a degree of shock-absorbing movement to the head 260, the flexible connector element 250 is carried within a well 266 which is slightly larger than the connector element 250 itself. Thus, resistant motion between the head 260 and shank 240 can be accommodated. A rubber washer 268 fits over the stud and acts to exclude dirt and corruption from the well 266. A non-resilient steel washer 270 fits within the rubber washer device 268 to provide good bearing and force transfer from the stud 248 and element 250 to the shank 240.

What is claimed is:

1. An empty and load air brake control apparatus for use in a unitized railroad train; the train including a plurality of railroad car body segments articulated together in end-to-end array; each car body segment being capable of being loaded independently of the other car bodies; and a plurality of railroad car trucks, the trucks being connected to the car body segments so that a single truck supports two adjacent car body ends; the air brake control apparatus comprising, in combination, a brake pipe capable of being pressurized with air, a control valve connected to the brake pipe, a control valve pipe connected to the control valve, a plurality of brake modulator valves each connected to the control valve pipe, and a corresponding plurality of brake actuators, each actuator being associated with a single truck and connected to a single modulator valve, the modulator valve including sensor means for sensing whether an associated truck is supporting loaded car body segments or empty car body segments, and modulating means for modulating air pressure provided from the control valve pipe to the brake actuator associated with the modulator valve in accordance with the condition of the sensor means so as to provide full pressure to the brakes when the car body segments are loaded, and partial pressure to the brakes when the car body segments are empty, the modulator valve sensor means including a sensor mallet, the mallet having a shank, an elastomeric member connected to the shank, a head member connected to the elastomeric member, the head defining a well within which is disposed the elastomeric member in spaced apart relationship to at least one well wall, the modulator valves each having a body mounted to the associated truck, and the mallet being disposed for intermittent engagement with the car body for sensing loaded or empty car body conditions.

2. Apparatus according to claim 1 including on-way check valve means permitting pressurized air to flow through the modulating means when the associated car body segment is in a substantially empty condition, but inhibiting operation of the modulating means so that unmodulated air pressure is provided to the brakes when the associated car body segment is loaded.

3. Apparatus according to claim 1 including one-way check valve means permitting air pressure to be released from the brake actuators when the modulator means is actuated.

* * * * *

UNITED STATES PATENT OFFICE
CERTIFICATE OF CORRECTION

Patent No. 4,824,179                                       Dated April 25, 1989

Inventor(s) James G. Rees

It is certified that error appears in the above-identified patent and that said Letters Patent is hereby corrected as shown below:

Col. 1, Line 57, adjcent should be adjacent

Col. 2, Line 34, appear when the valve is in its car-loaded configuration;

Col. 4, Line 66, diaphragm 10 should be diaphragm 160

Col. 8, Line 6, on-way should be one-way

Signed and Sealed this

Fourth Day of August, 1992

Attest:

DOUGLAS B. COMER

Attesting Officer          Acting Commissioner of Patents and Trademarks